July 12, 1966   P. JELINEK-FINK ET AL   3,260,865
GENERATOR OF HIGH-ENERGY ELECTROMAGNETIC SURGES
Filed July 2, 1962                      2 Sheets-Sheet 1

Peter Jelinek-Fink
Hermann Jordan
Willibald Anger
Hans Beerwald
Hermann Fay
Eduard Hintz
        INVENTORS.

BY   Karl F. Ross
        AGENT.

July 12, 1966  P. JELINEK-FINK ETAL  3,260,865
GENERATOR OF HIGH-ENERGY ELECTROMAGNETIC SURGES
Filed July 2, 1962  2 Sheets-Sheet 2

Peter Jelinek-Fink
Hermann Jordan
Willibald Anger
Hans Beerwald
Hermann Fay
Eduard Hintz
INVENTORS.

BY  *Karl F. Ross*

AGENT.

United States Patent Office 3,260,865
Patented July 12, 1966

3,260,865
GENERATOR OF HIGH-ENERGY ELECTRO-MAGNETIC SURGES
Peter Jelinek-Fink, Julich, Hermann Jordan, Aachen, Willibald Anger, Julich, Hans Beerwald, Cologne-Klettenberg, Hermann Fay, Aachen, and Eduard Hintz, Solingen-Grafrath, Germany, assignors to Kernforschungsanlage Jülich des Landes Nordrhein-Westphalia, Julich, Rhineland, Germany, a corporation of Germany
Filed July 2, 1962, Ser. No. 207,473
Claims priority, application Germany, July 1, 1961,
K 44,152, K 44,153
17 Claims. (Cl. 307—109)

Our present invention relates to a circuit arrangement for the resonant discharge of capacitively stored electrical energy through a predominantly inductive load for the purpose of temporarily generating electromagnetic fields of great intensity. Such systems are used, for example, in the magnetic compression of a plasma in nuclear reactors and other sources of high-energy radiation.

In systems of this description it is often necessary to realize magnetic fields of the order of $10^5$ to $10^6$ gauss, with currents as high as $10^7$ to $10^8$ amps, advantageously by the simultaneous discharge of a bank or battery of condenser units through a load inductance whose own inductivity may have a magnitude of the order of hundreths of microhenries. The condenser units, charged from a high-voltage source through large series resistances, are dischargeable by way of normally open switches which are substantially concurrently closed by a suitable control device. In practice these switches are usually of the electronic type, i.e. they are represented by normally non-conductive discharge devices which are temporarily triggered into conductive condition by a control circuit such as a spike generator.

It has heretofore been assumed that the capacitive storage units and their connections with the load should be as nearly noninductive as possible in order that the available magnetic-field force be concentrated in the load inductance itself. Should any condenser unit be accidentally short-circuited while the switches are open, the possible damage due to a discharge of the stored energy through a short circuit will be limited, even though all the units are connected across the same power supply, in view of the large charging resistances respectively in series therewith. If, however, such short circuit should occur while the switches are closed, all the unimpaired condenser units would tend to discharge their residual energy through the defective unit rather than through the load so that, in view of the high energies involved, a violent explosion with tremendous destructive effects may ensue. The danger of such explosion is so serious as to have militated heretofore against the practical utilization of circuit arrangements of this character.

The general object of our invention, therefore, is to provide an improved system for the generation of high-intensity electromagnetic fields in which this drawback is avoided.

In accordance with this invention we provide, in series with each capacitive storage unit, a protective inductance whose magnitude is large in comparison with that of the load inductance, the number of storage units and, therefore, of associated protective inductances being so large that the parallel combination of all the protective inductances, upon closure of the respective switches, constitutes an overall inductance which is small with reference to the load inductance. With one hundred or more storage units, for instance, it is possible to provide in series with each of these units a protective inductance exceeding the load inductance in magnitude by a factor of ten or more whereas the load inductance, in turn, bears a similar ratio to the overall inductance of the parallel-connected circuit branches which lead to the multiplicity of storage units and contain the associated switches.

The large number of storage units present in such a system (e.g. up to a thousand or more) has the additional advantage that the individual electronic switches connected thereto are taxed only to a relatively minor extent and have a correspondingly increased useful life. These switches, in a preferred embodiment, from spark gaps in series with the respective storage units and may be actuated by the firing of an auxiliary spark gap as is well known per se. It will be apparent, however, that other electronic switching devices such as thyratrons, controlled rectifiers and the like, all susceptible to triggering by an external timing signal, may be used in analogous manner.

The primary function of the protective inductances is to channel the bulk of the energy from the intact storage units through the load inductance, rather than through a defective unit, in the event of a short circuit. At the same time it has been found desirable to extend artificially the time interval during which the various switches may close since, in the preferred case in which these switches are of the electronic type and from spark gaps in series with the respective storage units, their triggering cannot always be so accurately synchronized as to occur precisely at the same instant. In the case of a multiplicity of such switches their instants of firing are, therefore, statistically distributed over a finite period, hereinafter referred to as the triggering interval T, which cannot extend beyond twice the propagation time of a signal from the output electrode of a switch to the common bus bar forming the junction of all the switches with the load inductance; after that time the breakdown potential of the first-fired switch has reached the load terminal of any switch that is still in its nonconductive state so that the voltage difference thereacross is reduced to substantially zero. Since, however, the discharge initiated by the firing of the switches has a resonant character owing to the small damping factor of the low-resistance current paths established by the operation of these switches, the counter-E.M.F. impressed upon the switches by the inductive load will reverse its polarity after a quarter-cycle of the resonance frequency and will then rise to a level, within the second quarter-cycle, which may be sufficient to fire any switch that has remained nonconductive. If a switch breaks down under these circumstances, the voltage suddenly applied across its storage unit may be up to twice as large as the maximum charging voltage if the branch circuit leading to this unit is free from substantial inductances; with the aforementioned protective inductance included in such circuit, however, the overvoltage impressed upon the storage unit may reach up to three times the value of the maximum charging voltage. It is clear that these adnormally high voltages could easily destroy the affected storage unit if the load is energized at this instant by the discharging current from all or most of the remaining units; this danger, accordingly, is minor if only a single switch or a small number of switches fire prematurely, but is very substantial if a switch is retarded in its firing with reference to the remaining switches.

Our invention, therefore, has for another object the provision of effective means for minimizing the risk of uncontrolled breakdown of electronic discharge devices used as switches in a system of the type described.

In accordance with a further feature of this invention, the above object is realized through the provision of a discharging circuit in which each storage unit is effectively in series with a plurality of spark gaps formed by respective discharge devices whereby the probability of the firing of at least one such device during the aforementioned interval T is exponentially increased. Thus, if this probability is designated $p$ for a single spark gap, the probability P of the firing of any spark gap connected to a given storage unit will equal $1-(1-p)^k$ wherein $k$ is the number of discharge devices so connected.

More specifically, the several discharge devices associated with a single storage unit may be connected in parallel with one another in the corresponding branch of the discharge circuit, or an inductive cross-connection may be established between parallel branches. Naturally, both measures may be used concurrently.

Another feature of our invention, which if desired may again be applied conjointly with the measures described above, resides in the utlization of a trigger circuit which is no longer a generator of short spikes, as has been assumed in the case of the copending application, but has an output with relatively broad pulses which maintain the triggering action for a period substantially equal to or greater than a quarter-cycle of the resonant frequency of the overall system. By this means it is possible to insure that any switch breakdown occurring after the normal triggering interval T will take place before the impressed counter-E.M.F. has gone through zero, thus within the first quarter of the cycle, so that the overvoltage on the associated storage unit will attain not more than a fraction of the value it would otherwise have.

The invention will be described in greater detail with reference to the accompanying drawing in which.

Figure 1:
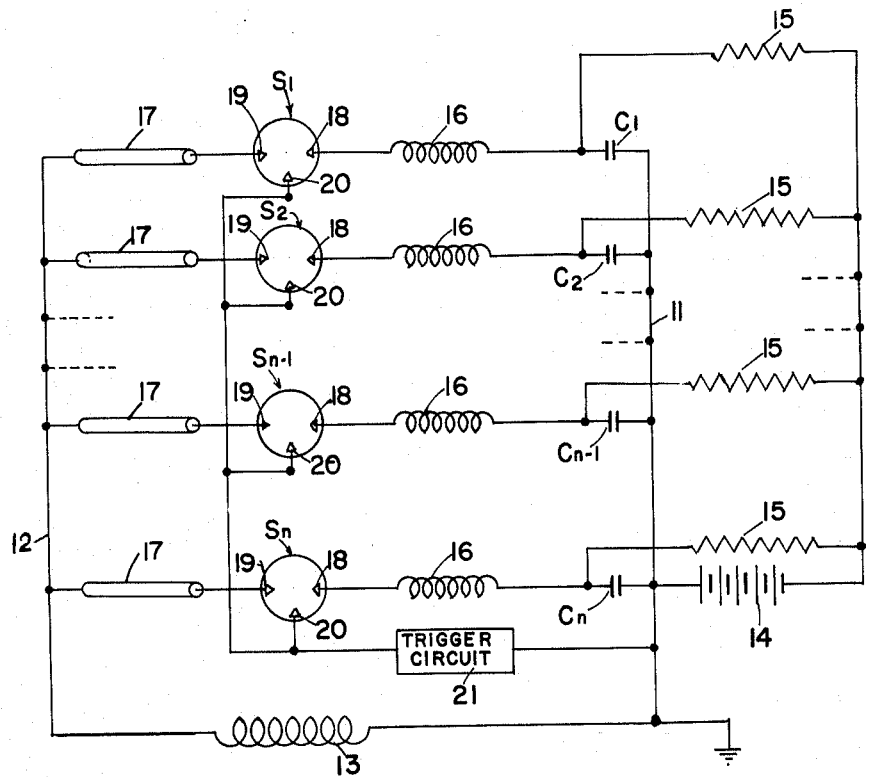
FIG. 1 shows a circuit diagram of a first embodiment of a magnetic-field generator as outlined above.

The system illustrated in FIG. 1 comprises a bank of capacitive storage units respectively designated $C_1$, $C_2$ ... $C_{n-1}$ and $C_n$ connected in parallel between a grounded bus bar 11 and a load bus bar 12, a predominantly inductive load 13 being connected across these bus bars. The storage units $C_1$ to $C_n$ have been shown for the sake of simplicity as individual condensers, yet it is to be understood that they could also be of more complex structure and may each comprise a group of condensers interconnected in various ways (e.g. in parallel with one another). In particular, each unit may be constituted by a delay network with series inductances and shunt capacitances as illustrated at C in FIG. 2.

A source of high voltage, schematically illustrated as a battery 14, is connected in parallel across the several storage units $C_1$ to $C_n$ by way of respective high-ohmic charging resistor 15. A low-ohmic discharge path extends from the ungrounded terminal of each unit to the bus bar 12 and includes, apart from a respective switch $S_1$, $S_2$ ... $S_{n-1}$, $S_n$, a protective inductance 16 and a transmission line 17 in series with the main spark gap formed by the electrodes 18, 19 of the associated switch. The transmission lines 17 may have predetermined delay characteristics, as by including networks of the type shown in FIG. 2 or their distributed-reactance equivalents, in order to retard the propagation of a wave front from the output electrode 19 of one of the switches to the corresponding electrode of another switch, thereby affording a lengthened time interval for the imperfectly synchronized firing of the switches as will be more fully described in connection with FIGS. 3 and 4. For the purpose of such firing there is provided in each switch at least one further electrode 20 to form an auxiliary spark gap, e.g. with one of the main electrodes such as electrode 18, which is fired at a predetermined instant by a trigger circuit 21 of conventional type. This trigger circuit may be, for example, a spike generator with a repetition period which is large compared with the time constant of each charging circuit 15, C. A preferred form of trigger circuit will be described hereinafter with reference to FIGS. 3 and 4.

In the normal operation of the system shown in FIG. 1, trigger pulses from circuit 21 fire the switches $S_1$ to $S_n$ substantially concurrently whereupon the charges accumulated in the multiplicity of storage units $C_1$ to $C_n$ are drained off through the load inductance 13. Since the discharge circuits completed by the firing of the switches have very low attenuation compared with the charging circuits 15, resonant type of discharge is initiated; it will be understood that this discharge will be confined to substantially a half-cycle of the resonant wave if either the switches $S_1$ to $S_n$ or any other part of each discharge circuit has rectifying characteristics. The storage units then recharge the resistances 15 and the cycle can be repeated.

Let it be assumed that a breakdown of condenser $C_1$ has occurred upon the firing of switch $S_1$ and that this condenser is therefore short-circuited. With all the other storage units intact, these units $C_2$ to $C_n$ will discharge through the short circuit at $C_1$ in parallel with the load inductance 13, the magnitude of the load current being related to that of the sort-circuit current in substantially the inverse ratio of the magnitudes of the inductances 13 and 16.

If the several inductances 16 are not identical, then, in order to realize the advantages of this invention, it is necessary to satisfy the relationship.

$$\frac{1}{\sum_{i=1}^{n-1}\frac{1}{L_{16(i)}}} \ll L_{13}$$

wherein $L_{16(i)}$ is the magnitude of the inductance 16 in the $i^{th}$ branch of the circuit and $L_{13}$ is the magnitude of the load inductance 13. For large values of $n$ it is, of course, permissible to substitute "$n$" for "$n-1$" in the above inequality. If the inductances 16 are all of the same magnitude $L_{16}$, the formula simplifies to $$\frac{L_{16}}{n} \ll L_{13}$$

Since at the same time $L_{16}$ is to be substantially larger than $L_{13}$, e.g. by a factor $m$ so that $L_{16}=mL_{13}$, the desired relationship will be obtained if $n$ is considerably greater than $m$. Thus, $m$ may be approximately 10 while $n$ may range between 100 and 1000.

If, for example, the load inductance 13 has a magnitude of $5 \times 10^{-8}$ H and each protective inductance 16 is about ten times as large, substantially 90% of the stored energy will discharge through the load and only the remainder will be dissipated in the condenser battery and its associated circuits.

Figure 2:
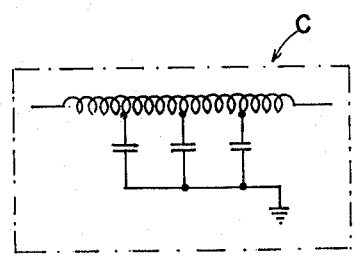
FIG. 2 shows in detail a specific storage unit adapted to be used in such system.

It will be understood that the illustrated protective inductances 16 symbolize any inductances effectively in series with the condensers $C_1$ to $C_n$, including those that may be present in the transmission lines 17 or in the capacitive units themselves (cf. FIG. 2).

Figure 3:
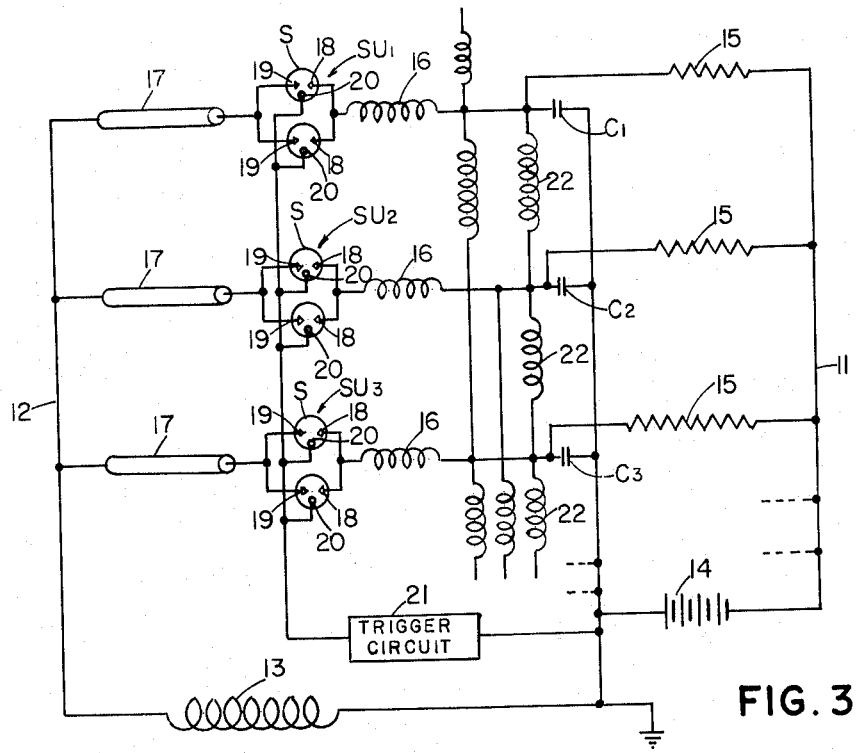
FIG. 3 shows a circuit diagram of a second embodiment of a magnetic-field generator as outlined above.

The system illustrated in FIG. 3 comprises a bank of capacitive storage units similar to those of FIG. 1 of which only the first three, respectively designated $C_1$, $C_2$ and $C_3$, have been illustrated. These units are connected in parallel between ground bus bar 11 and load bus bar 12, the predominantly inductive load 13 being connected across these bus bars.

Battery 14 is again connected in parallel across the several storage units $C_1$ etc. by way of respective high-ohmic charging resistors 15. A low-ohmic discharge path extends from the ungrounded terminal of each storage unit to the bus bar 12 and includes, apart from a respective switching unit $SU_1$, $SU_3$ etc., a protective inductance 16 and a transmission line 17 in series with both units. The transmission lines 17 may have predetermined delay characteristics to establish a delay period equal to $T/2$ which should be a small fraction of a cycle at the overall resonance frequency determined by the load inductance 13 and the parallel combination of all protective inductances 16.

Each switching unit $SU_1$ etc. consists of a plurality of individual switches S connected in parallel, only two such switches per unit having been illustrated in FIG. 3. Each switch S has two principal electrodes 18, 19, together defining a main spark gap in series with its condenser unit $C_1$ etc., and at least one further electrode 20 forming an auxiliary spark gap, as in FIG. 1, which is fired at a predetermined instant by the trigger circuit 21. This trigger circuit is preferably a generator of rectangular pulses with a repetition period which is large compared with the time constant of each charging circuit such as 15, $C_1$ etc. The duration of each output from trigger circuit 21 is substantially equal to at least a quarter-cycle of the aforesaid resonance frequency.

The ungrounded terminal of each condenser unit $C_1$ etc. is additionally connected, through an auxiliary inductance 22, to at least one like terminal of an other such condenser unit. Three such auxiliary inductances 22 have been illustrated by way of example for each condenser unit, although this number could of course be reduced or increased.

Figure 4:
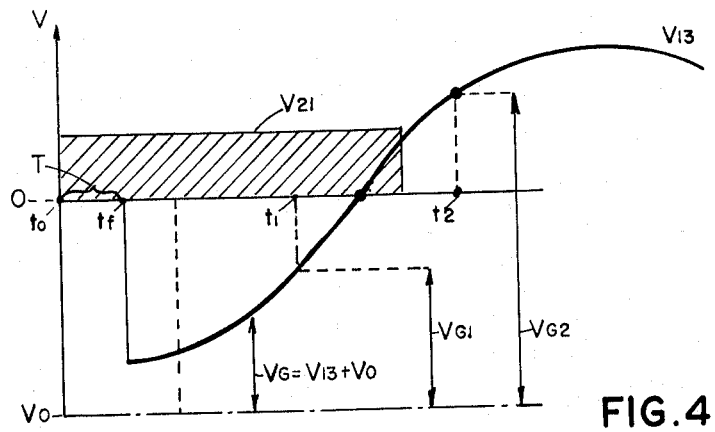
FIG. 4 is a graph used in explaining the operation of the latter system.

The operation of the system of FIG. 3 will now be described with reference to FIG. 4. In the latter figure, in which voltage (V) has been plotted against time ($t$), we have shown the normal triggering interval T as occurring between an instant $t_0$ and a subsequent instant $t_f$ which represents the firing time of the first switch and marks the start of the load-voltage curve $V_{13}$ as seen by an unfired switch after the time T. Other switches will also have fired within the interval T but will not have materially affected the shape of the curve $V_{13}$. If, however, one of the switching units such as the unit $SU_1$ fails to fire, the associated storage unit $C_1$ will be able to discharge through the inductive cross-connection 22 leading to a conductive switching unit, e.g. unit $SU_2$. It is desirable that this discharge of a storage unit through a neighboring branch of the circuit occur in step with the discharge of the entire condenser battery through the load inductance 13, hence the resonance frequency of the circuit $C_1$, 22 should be substantially equal to the aforementioned overall resonance frequency which has been represented in FIG. 2 by the swing of curve $V_{13}$. To this end, in a system with $n$ storage units of identical capacitance, the magnitude $L_{22}$ of each cross-inductance 22 will be equal to $nL_{13}$, i.e. to the magnitude of load inductance 13 as seen by each individual condenser unit through its own branch.

The first (negative) peak of the load voltage $V_{13}$ is slightly less than the charging voltage $V_0$ initially on the storage units $C_1$ etc., the difference being of course due to the energy dissipated in the condenser battery itself. At $V_G$ we have indicated the voltage developed across a spark gap 18–19 prior to its firing, this voltage dropping sharply to a very small value at the end of interval T and increasing thereafter to almost $2V_0$ at the end of the second half-cycle of wave $V_{13}$. The output pulse $V_{21}$ of trigger circuit 21 has been shown to extend over a period slightly greater than a quarter-cycle of this voltage wave. Thus, a nonconductive switch S may break down in the presence of pulse $V_{21}$ at an earlier time $t_1$, corresponding to a gap voltage $V_{G1}$, whereas in the absence of pulse $V_{21}$ such breakdown might occur only at the time $t_2$ when the gap voltage has attained a considerably larger value $V_{G2}$. It will be noted that, in this instance, $V_{G1}$ is less than half of $V_{G2}$ so that the overvoltage impressed upon the associated storage unit (e.g. $C_1$) will remain within tolerable limits even when one considers the transient voltages generated in inductance 16 shortly after the breakdown of the switch.

The circuit arrangement herein disclosed may, of course, be modified in various respects, as will be readily apparent to persons skilled in the art, without departing from the spirit and scope of the invention as defined in the appended claims; thus, for example, the system shown in FIGS. 1 and 3 may be combined with additional storage units which do not have the features specifically described and illustrated.

We claim:

1. A circuit arrangement for the resonant discharge of capacitively stored electrical energy through an inductive load, comprising a multiplicity of capacitive storage units, normally open individual switch means for each storage unit, conductor means with branches individual to said storage units and the associated switch means for connecting all of said storage units in parallel across said load in the closed condition of said switch means, inductive impedance means in each of said branches having a magnitude which is large compared with that of the load inductance, charging means for said storage units, and means normally effective to close all of said switch means at substantially the same time; said storage units, switch means and branches being so numerous that the parallel combination of all of said inductive impedance means in the closed condition of said switch means results in an overall series inductance for said load which is small in comparison with the load inductance.

2. A circuit arrangement for the resonant discharge of capacitively stored electrical energy through an inductive load, comprising a multiplicity of capacitive storage units, a multiplicity of normally nonconductive discharge devices forming a spark gap in series with each storage unit, conductor means with branches individual to said storage units and the associated discharge devices for connecting all of said storage units in parallel across said load in the conductive condition of said discharge devices, inductive impedance means in each of said branches having a magnitude which is large compared with that of the load inductance, charging means for said storage units, and means normally effective to trigger all of said discharge devices into conductive condition at substantially the same time; said storage units, discharge devices and branches being so numerous that the parallel combination of all of said inductive impedance means in the conductive condition of said discharge devices results in an overall series inductance for said load which is small in comparison with the load inductance.

3. A circuit arrangement according to claim 2 wherein said charging means includes a common voltage source and a multiplicity of predominantly resistive circuits respectively connecting said source across said storage units.

4. In a system for the generation of high-energy electromagnetic surges, in combination, a load inductance, a multiplicity of capacitive storage units, normally open individual switch means for each storage unit, low resistance conductor means with branches individual to said storage units and the associated switch means for connecting all of said storage units in parallel across said load inductance in the closed condition of said switch means, a protective inductance in each of said branches having a magnitude which is large compared with that of said load inducance, charging means for said storage units including a common source of high voltage and a multiplicity of high-resistance circuits connecting said source across said storage units, and means normally effective to close all of said switch means at substantially the same time; said storage units, switch means and branches being so numerous that the parallel combination of all of said protective inductances in the closed condition of said switch means results in an overall inductance in series with said load inductance which is small in comparison with the latter.

5. In a system for the generation of high-energy electromagnetic surges, in combination, a load inductance, a multiplicity of capacitive storage units, a multiplicity of normally nonconductive discharge devices forming a spark gap in series with each storage unit, low-resistance conductor means with branches individual to said storage units and the associated discharge devices for connecting all of said storage units in parallel across said load inductance in the conductive condition of said discharge devices, a protective inductance in each of said branches having a magnitude which is large compared with that of said load inductance, charging means for said storage units including a common source of high voltage and a multiplicity of high-resistance circuits connecting said source across said storage units, and means normally effective to trigger all of said discharge devices into conductive condition at substantially the same time; said storage units, discharge devices and branches being so numerous that the parallel combination of all of said protective inductances in the conductive condition of said discharge devices results in an overall inductance in series with said load inductance which is small in comparison with the latter.

6. The combination according to claim 5 wherein the ratio of said overall inductance to said load inductance is at most of the order of 1:10 and the ratio of each of said protective inductances to said load inductance is at least of the order of 10:1.

7. The combination according to claim 5 wherein said load inductance has a magnitude of the order of hundredth of microhenries.

8. The combination according to claim 5 wherein the number of said storage units range between substantially 100 and 1000.

9. A system for the resonant discharge of capacitively stored electrical energy through an inductive load, comprising a multiplicity of capacitive storage units, normally open individual switch means for each storage unit, conductor means with branches individual to said storage units and the associated switch means for connecting all of said storage units in parallel across said load in the closed condition of said switch means with each storage device effectively in series with several of said switch means, inductive impedance means in each of said branches having a magnitude which is large compared with that of the load inductance, charging means for said storage units, and means normally effective to close all of said switch means at substantially the same time; said storage units, switch means and branches being so numerous that the parallel combination of all of said inductive impedance means in the closed condition of said switch means results in an overall series inductance for said load which is small in comparison with the load inductance.

10. A system for the resonant discharge of capacitively stored electrical energy through an inductive load, comprising a multiplicity of capacitive storage units, a multiplicity of normally nonconductive discharge devices forming at least one spark gap in series with each storage unit, conductor means with branches individual to said storage units and the associated discharge devices for connecting all of said storage units in parallel across said load in the conductive condition of said discharge devices with each storage device effectively in series with several of said spark gaps, inductive impedance means in each of said branches having a magnitude which is large compared with that of the load inductance, charging means for said storage units, and means normally effective to trigger all of said discharge devices into conductive condition at substantially the same time; said storage units, discharge devices and branches being so numerous that the parallel combination of all of said conductive impedance means in the conductive condition of said discharge devices results in an overall series inductance for said load which is small in comparison with the load inductance.

11. A system according to claim 10 wherein a plurality of spark gaps are connected in parallel in each of said branches.

12. A system according to claim 10, further comprising delay means in each of said branches.

13. A system according to claim 10 wherein said conductor means includes inductive cross-connections between parallel branches, said cross-connections enabling the discharge of a storage unit through a spark gap lying in series with another storage unit in said system.

14. A system according to claim 13, wherein the magnitude of the inductance of each of said cross-connections is of the order of $n$ times the load inductance, $n$ being the number of storage units.

15. In a system for the generation of high-energy electromagnetic surges, in combination, a load inductance, a multiplicity of capacitive storage units, a multiplicity of normally nonconductive discharge devices forming at least one spark gap in series with each storage unit, conductor means with branches individual to said storage units and the associated discharge devices for connecting all of said storage units in parallel across said load inductance in the conductive condition of said charge devices with small enough damping to enable a resonant discharge of said storage units through said load inductance, a protective inductance in each of said branches having a magnitude which is large compared with that of said load inductance, charging means for said storage units, trigger means for said discharger devices normally effective to render the latter conductive within a predetermined time interval which is short compared with the duration of a cycle of said resonant discharge, and timer means for maintaining said trigger means effective for a minimum period substantially equal to a quarter of said cycle; said storage units, discharge devices and branches being so numerous that the parallel combination of all of said protective inductances in the conductive condition of said discharge devices results in an overall inductance in series with said load inductance which is small in comparison with the latter.

16. The combination according to claim 15 wherein at least two of said discharge devices are connected in parallel in each of said branches.

17. The combination according to claim 15, wherein said conductor means includes inductive cross-connections between parallel branches with an inductivity whose magnitude is of the order of $n$ times that of said load inductance, $n$ being the number of storage units in said system.

References Cited by the Examiner

UNITED STATES PATENTS

| 2,578,263 | 12/1951 | Perkins | 320—1 X |
| 3,089,831 | 5/1963 | Kolb | 313—161 X |
| 3,125,492 | 3/1964 | Baker | 313—161 |

FOREIGN PATENTS

| 837,958 | 6/1960 | Great Britain. |

IRVING L. SRAGOW, *Primary Examiner.*

M. S. GITTES, *Assistant Examiner.*